Figure 1:
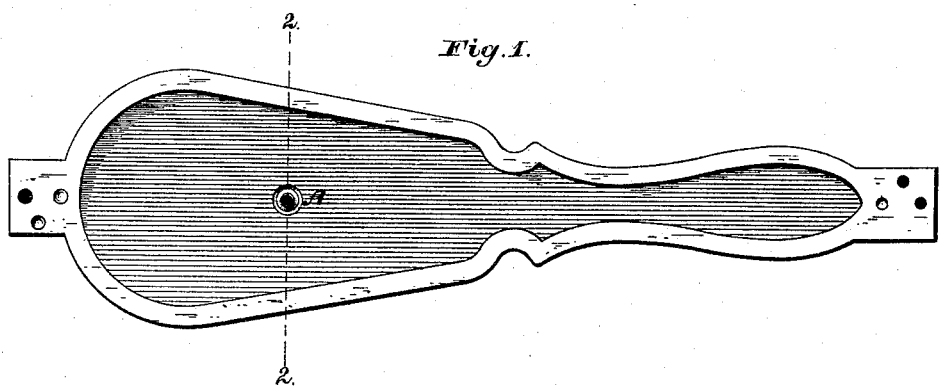

J. STEPP.
Mold for Rubber Articles.

No. 212,633. Patented Feb. 25, 1879.

Attest.
J. Henry Kaiser.
Walter Allen.

Inventor.
Jacob Stepp.
By Knight Bros.
Atty's.

UNITED STATES PATENT OFFICE.

JACOB STEPP, OF SOMERVILLE, MASSACHUSETTS.

IMPROVEMENT IN MOLDS FOR RUBBER ARTICLES.

Specification forming part of Letters Patent No. 212,633, dated February 25, 1879; application filed August 3, 1878.

*To all whom it may concern:*

Be it known that I, JACOB STEPP, of Somerville, in the county of Middlesex and State of Massachusetts, have invented a new and useful Improvement in Molds for Rubber Articles, of which the following is a specification:

The object of my invention is to provide a mold, such as is used in the manufacture of hollow india-rubber articles, or other hollow articles which are formed of similar gums, by means of steam or water pressure, with a secure and self-packing inlet or aperture for the admission of the steam or water to the interior of the article to be shaped or formed in a mold under pressure.

By means of my inlet I avoid the usual risk of loss of stock and labor more or less caused by the use of other inlets on such molds on account of the defective packing of the inlet.

My inlet produces a self-packing gate or duct, saves a great deal of labor in the process of filling the mold, and is always reliable. It is especially useful and practicable when used in the manufacture of hollow rubber articles in metal molds, when such articles are to be vulcanized by the application of the principles and method described in Letters Patent No. 178,432, granted to Charles Grasser on the 6th day of June, 1876. Under this patent the articles are vulcanized under pressure through the medium of water, which surrounds the mold and exercises pressure on the interior of the article, the water being introduced by an inlet.

In order to produce a duct or inlet which will be self-packing, and will prevent the intrusion of water between the rubber and the face of the mold, I provide on the interior of a mold a little projecting cone with a small hole in the center. The said cone is surrounded by a V-shaped groove or channel cut in the body of the mold, forming thereby a very practical contrivance for the purpose of packing the rubber over the water-inlet.

It is very essential that if hollow rubber articles are to be shaped and vulcanized under pressure through the medium of water, the rubber should be so arranged or packed at the inlet as to effectually prevent the intrusion of the water between the rubber and mold, which, if it takes place, will certainly cause the loss of the article.

By the use of some of the old methods of packing the inlet, a great deal of labor was involved in lining the inside of the aperture and screwing packing-plates on the outside of the mold, all of which is dispensed with by my improved inlet.

In order that my invention may be more clearly understood, I will proceed to describe the same with reference to the accompanying drawings, in which—

Figure 2:
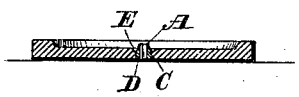
Figure 3:
Figure 4:
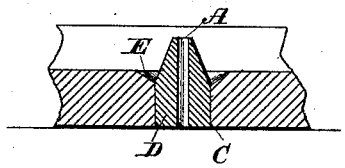

Figure 1 is a plan of half of a pair of molds, such as are used for rubber brush-handles. The inlet is at A, in the center of the mold. Fig. 2 is a cross-section of such mold on line 2 2, Fig. 1. Fig. 3 is a longitudinal section of the complete mold with the hollow product within it. Fig. 4 represents a vertical section of the inlet and its accessories on a larger scale.

At the most convenient place in a mold—that is to say, where a small hole in the article to be formed is the least objectionable—the inlet is made by drilling first a hole, C, about one-fourth of an inch in diameter. This hole has a taper countersink, E, at the inside of the mold. This hole is for the purpose of receiving a plug, D. The said plug has a small hole in the center, and is conically tapered at one end. The plug D is made to fit snugly in the hole C, and driven in from the outside of the mold until the conical point of the plug projects about one-eighth of an inch above the surface of the mold-cavity, after which it is permanently fastened. The taper countersink of the hole and the sides of the conical part of the plug form a V-shaped groove or channel around the cone.

The object of this device is this: When a sheet of rubber is laid in the mold for the purpose of forming an article, the cone will perforate it by a little pressure, and by means of a suitable tool the rubber is packed close around the cone and into the V-shaped groove or channel. The small hole in the conical plug, if closed by fragments of rubber, is then opened by means of a piercing-tool, and this completes the packing of the inlet.

The operating principle of such packing is as follows: As soon as water or steam enters under pressure through the small hole, the force acts at once against the internal surface of the rubber in the mold, and packs the rubber still more firmly around the cone and into the V-shaped groove, making it impossible for the water to find its way between the rubber and the surface of the mold.

With the inlets heretofore employed for the introduction of fluids to produce pressure in casting rubber articles larger holes are required, so as to leave room to line the inlets with rubber, which is lapped over at the outside of the mold and there secured by a packing-plate.

To say nothing of the greater amount of labor, there is a great deal of risk in tearing the lining off the inlet without perceiving it, or the inlet-aperture will close by an excess of rubber, both of which dangers often prove fatal to the production of the article under the usual mode of operation.

Having thus described my invention, the following is what I claim as new therein and desire to secure by Letters Patent:

1. A perforated conical projection in a mold surrounded by a V-shaped groove, for the purpose described.

2. A mold provided with an inlet formed by a conical perforated plug, extending above the surface of the mold-cavity, in the manner and for the purpose set forth.

JACOB STEPP.

Witnesses:
  J. J. C. SMITH,
  ALEX. WOOD.